Dec. 5, 1961  W. G. BUCKNER ET AL  3,011,803
SWIVEL CONDUIT JOINT
Filed Jan. 31, 1958  2 Sheets-Sheet 1
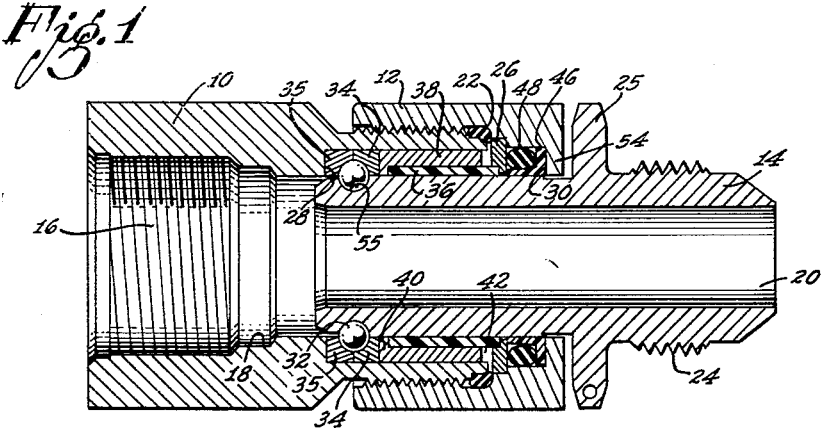
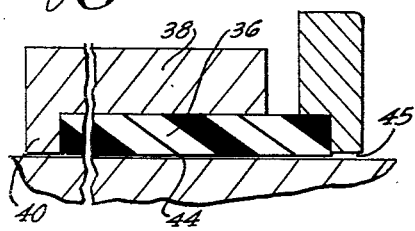
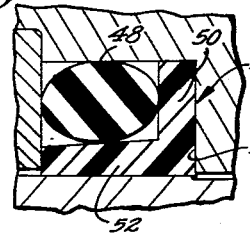
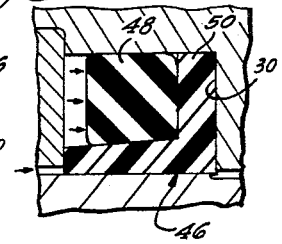
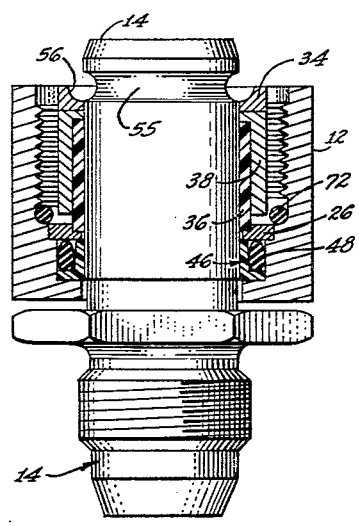
INVENTORS:
Wilbur G. Buckner
Norris J. Brown
By Smyth & Roston
Attorneys Dec. 5, 1961 W. G. BUCKNER ET AL 3,011,803
SWIVEL CONDUIT JOINT
Filed Jan. 31, 1958 2 Sheets-Sheet 2

INVENTORS:
Wilbur G. Buckner
Norris J. Brown

Attorneys

United States Patent Office 3,011,803
Patented Dec. 5, 1961

3,011,803
SWIVEL CONDUIT JOINT
Wilbur G. Buckner, Los Angeles, and Norris J. Brown, Inglewood, Calif., assignors to Dumont Aviation Associates, Long Beach, Calif., a corporation of California
Filed Jan. 31, 1958, Ser. No. 712,397
4 Claims. (Cl. 285—23)

This invention relates to rotary joints for pipes, tubing, hose, and the like, and particularly relates to a swivel joint for high pressure fluid systems such as hydraulic systems. The type of rotary joint to which the invention pertains comprises an inner passage body telescopically journaled into an outer passage body with annular sealing means embracing the inner passage body to retain the confined fluid.

One problem to which the invention is directed is to achieve an effective seal against pressures which may be on the order of 3000 p.s.i. and to do so with freedom for rotation and with minimum resistance to rotation of the joint structure. This problem is met by employing two cooperating sealing rings in an annular sealing space between the two passage bodies. The annular sealing space is bounded by opposite end surfaces and is also bounded by an inner circumferential surface of the outer passage body and an outer circumferential surface of the inner passage body.

The two sealing rings comprise a first ring of synthetic resin backed against one of the end surfaces in sealing contact with both of the circumferential surfaces of the two passage bodies, and a second deformable ring of rubber-like material exposed to the internal fluid pressure to be driven thereby against the first ring. The first ring, which is in sealing contact with both of the passage bodies, is made of a synthetic resin having a low coefficient of friction in contact with metal. The first ring is of L-shaped configuration in radial cross section to form an annular seat for the second ring. Thus the first ring has a radially extending flange portion backed against the end wall of the annular sealing space and has an axially extending flange portion that embraces the inner passage body and extends towards the inner end of the inner passage body. The second ring is positioned in the angle formed by these two flanges.

Another feature of the invention is the cencept of tapering the axial flange of the first sealing ring to form a progressively restricted annular wedge space into which the second ring is forced by fluid pressure. In the preferred practice of the invention, the second ring fits tightly around the axial flange of the first ring and resiliently resists climbing the tapered surfaces of the axial flange when the fluid pressure tends to make it do so. Preferably the second ring has an unrestrained radial dimension greater than the radial space that is provided by the tapered surface of the axial flange of the first ring.

Another problem to which the invention is directed is to provide a swivel joint of the character described between two coaxial passage bodies with effective yielding resistance to lateral forces that tend to swing the two passage bodies out of axial alignment with each other. This problem is met by providing a ball bearing to serve as a fulcrum for moments of force that tend to rock the two passage bodies out of axial alignment with each other, and by further employing a relatively long bearing sleeve of suitable low friction plastic material to resist such moments, the length of the sleeve being more than one-half of its outside diameter.

In the preferred practice of the invention the two telescoped passage bodies form an annular space surrounding the inner passage body, which space is divided by annular means into a sealing space and a bearing space. The two above-mentioned sealing rings are in the sealing space and the ball bearing together with the low friction plastic bearing sleeve are in the bearing space.

A third problem to which the invention is directed is to provide a swivel joint having these features in which the ball bearing serves as positive means to interlock the two passage bodies against axial separation and in which the positively acting ball bearing may be readily assembled in the course of fabrication of the swivel joint. In this regard a feature of the invention is the concept of utilizing the low friction plastic bearing sleeve for yieldingly retaining the balls of the bearing in their assembled positions before the ball bearing is completely assembled. For this purpose the inner race of the ball bearings comprises a peripheral circumferential groove formed in the inner passage body and the outer race is provided by two ring members which cooperate to form an outer annular groove for the balls.

The groove around the inner passage body and one of the two rings are so dimensioned and formed that when this one ring is in its normal position, it cooperates with the peripheral groove of the inner passage body to lock the balls in their assembled position. The plastic bearing sleeve is longitudinally resilient and yieldingly maintains this one ring in its normal position. Thus it is merely necessary to retract this one of the two bearing rings axially against the resistance of the resilient plastic bearing sleeve to make the peripheral groove of the inner passage body accessible for the introduction of the bearing balls. After the balls are installed the ring is released for return to its normal position by the resilient plastic bearing sleeve to retain the balls in the peripheral groove.

The various features and advantages of the invention will be apparent from the following detailed description considered with the accompanying drawings.

In the drawings, which are to be regarded as merely illustrative:

FIGURE 1 is a longitudinal sectional view of a selected embodiment of the invention as a straight swivel joint;

FIGURE 2 is an enlarged portion of FIGURE 1 showing how the plastic bearing sleeve is related to a surrounding spacer sleeve and an annular means that abuts one end of the sleeve;

FIGURE 3 is an enlarged portion of FIGURE 1 showing the two sealing rings in the annular sealing space under conditions of relatively low fluid pressure;

FIGURE 4 is a view similar to FIGURE 3 showing the two sealing rings under high fluid pressure;

FIGURE 5 is a view partly in side elevation and partly in longitudinal section showing the partially assembled swivel joint ready for the introduction of the balls of the ball bearing;

Figure 6:
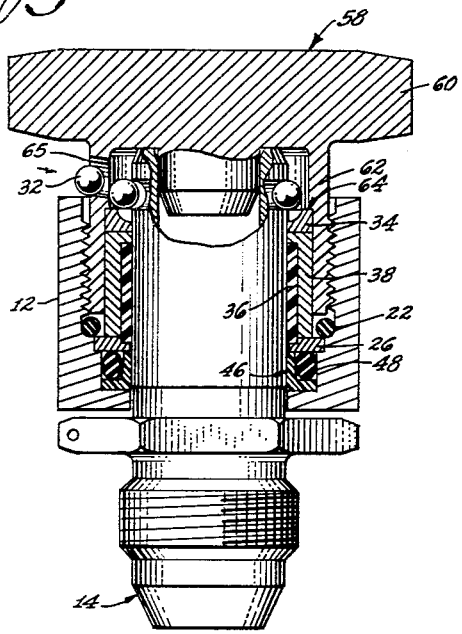
FIGURE 6 is a view similar to FIGURE 5 showing how a special tool is applied to the partially assembled structure of FIGURE 5 to retract a bearing ring against the resistance of the plastic bearing sleeve to a sufficient degree to permit the introduction of the steel balls of the bearing.

The first embodiment of the invention illustrated by FIGURES 1 to 7 comprises an outer passage body 10, a bushing 12 which may be regarded as a part of an extension of the outer passage body, and an inner passage body 14 that is telescoped in and journaled in the outer passage body. The outer passage body 10, which may be of hexagonal peripheral configuration, has an internal screw thread 16 for connection with conduit means and is externally threaded, as shown, for engagement by the bushing 12. The outer passage body 10 has an axial fluid passage 18 which communicates with the fluid passage 20 of the inner passage body 14 and is axially aligned therewith.

The outer passage body 10 cooperates with the bushing 12 to confine and compress a sealing ring 22 which may be made of a suitable rubber-like material such as Neoprene. The inner passage body 14 may have an external screw thread 24 for connection to conduit means and may be formed with a radial flange 25 of hexagonal peripheral configuration.

The outer passage body 10 and the inner passage body 14 cooperate in their assembled positions to form an annular space around the inner passage body, and this annular space is divided by an annular means or dividing ring 16 into an annular bearing space and an adjacent annular sealing space. In this particular construction the annular space that is divided by the ring 26 is bounded by two end surfaces and is further bounded by an inner circumferential surface of the outer passage body and an outer circumferential surface of the inner passage body. Thus one end of the annular space on one side of the dividing ring 26 is formed by an inner radial shoulder 28 of the outer passage body 10 and the end of the annular space on the other side of the dividing ring 26 is formed by a second inner radial shoulder 30 of the bushing 12. The annular dividing means 26 is in the form of a metal ring mounted in the outer passage body, the metal ring being rigidly clamped in its assembled position by the bushing 12.

The annular bearing space between the dividing ring 26 and the inner radial shoulder 28 is occupied by a bearing assembly comprising a series of steel balls 32, a pair of abutting bearing rings 34 and 35, a low friction plastic bearing sleeve 36, and a metal spacer sleeve 38. As may be seen in FIG. 1, the low friction plastic bearing sleeve 36 is in the same radial zone as the ball bearing comprising the steel balls 32 and the bearing rings 34 and 35, i.e., the plastic sleeve lies within the inner and outer circumferences of the ball bearing. The bearing ring 35 abuts the previously mentioned inner radial shoulder 28; the bearing ring 35 abuts the bearing ring 34; the spacer sleeve 38 abuts the bearing ring 34 and is formed on the same end with an inner radial flange 40 that abuts the corresponding end of the plastic bearing sleeve 36; and the second end of the plastic bearing sleeve abuts the dividing ring 26.

As shown in FIGURE 1, the dividing ring 26 is undercut to receive the end of the plastic bearing sleeve 36 and the spacer sleeve 38 that surrounds the bearing sleeve terminates short of the dividing ring 26 to form therewith an annular clearance space 42. It is apparent that this bearing assembly is confined between the inner radial shoulder 28 and the dividing ring 26 to keep the bearing tight, the two bearing rings 34 and 35 being clamped between the inner radial shoulder 28 and the spacer sleeve 38.

It is further apparent that if there is freedom for the plastic bearing sleeve 36 to increase in thickness in response to axial compression, the bearing assembly may be contracted axially against the yielding resistance of the plastic bearing sleeve, such contraction being limited to the axial dimension of the annular clearance space 42. As may be seen in FIGURE 2, preferably the inner diameter of the resilient bearing sleeve 36 is slightly larger than the adjacent diameter of the inner passage body 14 to provide a slight circumferential clearance space 44. The radial dimension of this clearance space 44 may, for example, be approximately .001 inch. It is also to be noted in FIGURE 2 that the inside diameter of the dividing ring 26 is even larger than the diameter of the inner passage body 14 to provide a circumferential clearance space 45 of even greater radial dimension. The radial dimension of the clearance space 45 may, for example, be .005 inch.

Suitable sealing means is mounted in the annular sealing space defined by the dividing ring 26, the inner radial shoulder 30, the inner circumferential surface of the bushing 12 and the peripheral circumferential surface of the inner passage 14. In this particular embodiment of the invention, the sealing means comprises a first sealing ring 46 and a second sealing ring 48 cooperating therewith.

The first sealing ring 46 is made of suitable plastic material, preferably a material that has a high resistance to heat as well as a low coefficient of friction with respect to the adjacent metal surfaces. In this instance, it is contemplated that the first sealing ring 48 will be made of polytetrafluoroethylene, commonly available under the tradename Teflon. The second sealing ring 48 is of rubber-like, yielding material and, in this instance, is a neoprene O-ring.

As may be seen in FIGURES 3 and 4, the first sealing ring 46 is of L-shaped radial cross-sectional configuration to form an angular seat for the second sealing ring 48. Thus, the first sealing ring 46 has a radial flange 50 that backs against the radial shoulder 30 of the annular sealing space and has an axial flange 52 that embraces the outer circumferential surface of the inner passage body 14.

The axial flange 52 of the first sealing ring 46 is tapered, as shown in FIGURES 3 and 4, and thereby forms with the inner circumferential surface of the bushing 12 a tapered annular wedge space for the second sealing ring 48. Since the inner radial shoulder 30 of the bushing 12 faces toward the inner end of the inner passage body 14, the pressure of the confined fluid presses the first sealing ring 46 against the radial shoulder 30 and also backs the second sealing ring 48 against the radial flange 50 of the first sealing ring.

At the unstressed configuration of the first sealing ring 46, its inner diameter is slightly less than the diameter of the inner passage body 14. In assembling the sealing ring 46, it is temporarily expanded, for example, by means of a taper pin, and then is slipped onto the circumferential surface of the inner passage member 14. Subsequently, the expanded sealing ring seeks to return to its normal inner diameter and thus embraces the inner passage member 14 under permanent circumferential tension for a snug pressure fit therewith.

Preferably the inner diameter of the second sealing ring 48 at its unstressed configuration is approximately the outer diameter of the first sealing ring 46 at the toe of the axial flange 52. When fluid pressure acts on the second sealing ring 48, it shifts up the taper or slope of the axial flange 52 of the first ring 46 with consequent progressively increasing expansion and circumferential tension for increasing tight fit around the axial flange.

It is also contemplated in the preferred practice of the invention that the radial dimension of the second sealing ring 48 at its unstressed configuration will be slightly greater than the radial dimension of the space provided in the angular seat formed by the first sealing ring 46. Thus the second sealing ring 48 must be radially compressed out of round to fit into its assembled position and, by virtue of the taper of the axial flange 52, the second sealing ring is increasingly compressed radially as it is forced by fluid pressure towards the radial flange 50 of the first sealing ring.

Under relatively low or moderate fluid pressure, the second sealing ring 48 may take a position somewhat like that shown in FIGURE 3. Under relatively high fluid pressure, say fluid pressure of 1500 p.s.i. or higher, the second sealing ring 48 is distorted into intimate void-free pressure contact with both the first sealing ring 46 and the inner circumferential surface of the bushing 12, the second sealing ring being wedged compactly into its seat, as shown in FIGURE 4. The greater the internal fluid pressure, the greater the sealing pressure of the second sealing ring 48 against the surrounding inner circumferential surface of the bushing 12 and the greater the radially inward pressure of the axial flange 52 of the first sealing ring 46 against the adjacent circumferential surface of the inner passage body 14. The two sealing rings 46 and 48 tend to remain fixed relative to the outer passage body, i.e. the bushing 12 that is unitary therewith, the relative rotation occurring between the Teflon ring 46 and the inner passage body 14 that it embraces.

The manner in which the described swivel joint functions for its purpose may be readily understood from the foregoing description. The only unyielding metal-to-metal connection between the outer passage body 10 and the inner passage body 14 is provided by the steel balls 42. Both of the bearing rings 34 and 35 are out of contact with the inner passage body 14. The inner radial flange 40 of the spacer sleeve 38, the dividing ring 26 and the radial flange 54 of the bushing 12 are all of larger inside diameter than the outside diameter of the adjacent portions of the inner passage body 14. Thus, there is no metal-to-metal interference with any tendency of the two passage bodies 10 and 14 to swing out of axial alignment with each other in response to forces acting on the swivel joint laterally thereof. Any such metal-to-metal interference would of course create undesirable frictional resistance to relative rotation of the two passage bodies and consequent undesirable wear. All such moments of force, however, are taken by the low friction bearing sleeve 36 which is preferably made of a polyamide that is commonly available under the tradename nylon.

Figure 7:
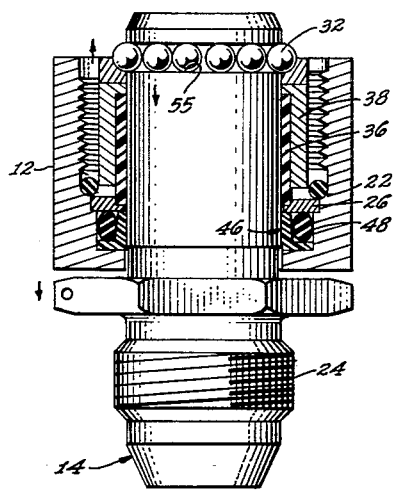
FIGURE 7 is a view similar to FIGURE 6 with the tool removed and with the plastic bearing sleeve holding the bearing ring in position to trap the balls of the ball bearing for retention of the balls during completion of the assembly procedure.

The manner in which the bearing assembly and especially the resilient plastic bearing sleeve 36 facilitates the assembly of the device may be understood by reference to FIGURES 5, 6 and 7. The bushing 12, separate and apart from the outer passage body 10, is provided with the O-ring 22 and then is telescoped over the inner passage body 14, with the inner passage body member in upright position as shown in FIGURE 5. The two sealing rings 46 and 48 are then dropped into the annular sealing space which is then closed by insertion of the dividing ring 26. The nylon bearing sleeve 36 is inserted into position in abutment against the dividing ring 26, and then the spacer sleeve 38 is telescoped over the nylon sleeve. The bearing ring 34 is then added to complete the preliminary assembly shown in FIGURE 5.

The inner passage body 14 is formed with a circumferential groove 55 which is of circular cross-sectional configuration and serves as the inner race for the bearing balls 42. The two bearing rings 34 and 35 together form a similar groove to serve as the outer race for the bearing balls. Thus the bearing ring 34 in FIGURE 5 is formed with an inner half-groove 56.

It can be seen in FIGURE 5 that the weight of the bearing ring 34 and the spacer sleeve 38 is borne by the nylon sleeve 36 and that the nylon sleeve holds the bearing ring 34 at approximately its normal position at which the half-groove 56 of the bearing ring registers with the bearing groove 55 of the inner passage body 14. The depth of the inner groove 55 and the depth of the half-groove 56 are such that they extend more than halfway around a bearing ball 32 and therefore will cause a bearing ball to be trapped in the circumferential groove 55. In other words, when the bearing ring 34 is at its normal position relative to the circumferential groove 55, the entrance to the bearing groove is less than the diameter of a bearing ball 32.

The advantage of this arrangement is that the nylon sleeve 36 resiliently holds the bearing ring 34 in its normal position and the nylon sleeve may be compressed longitudinally in the manner of a spring for retraction of the bearing ring to permit the bearing balls to be installed in the peripheral groove 55. After the balls are installed, the bearing ring 34 may be released to release the nylon sleeve 36 from longitudinal compression, whereupon the nylon sleeve expands longitudinally to its normal configuration and thus causes the bearing ring 34 to trap and retain the bearing balls in the peripheral groove 55.

FIGURE 6 shows how a tool, generally designated by numeral 58, may be used for the purpose of temporarily retracting the bearing ring 34 against resistance of the nylon sleeve 36 to permit the steel balls 32 to be inserted. The tool 58 has a thick handle or knob 60 which may be of hexagonal peripheral configuration and has a thin cylindrical wall 62 that is dimensioned to extend into the bushing 12 into screw engagement with the bushing. When the preliminary assembly shown in FIGURE 5 is completed, the tool 58 is inserted into the bushing 12 and is screwed down. The cylindrical wall 62 of the tool has an inner circumferential shoulder 64 which engages the bearing ring 34 to depress the bearing ring in opposition to the resilient resistance of the nylon sleeve 36. Just above the inner circumferential shoulder 64, the cylindrical wall 62 of the tool has an aperture 65 large enough to admit the steel balls 32.

When the tool 58 depresses the bearing ring 34 sufficiently to make the peripheral groove 55 of the inner passage body 14 fully accessible for introduction of the steel balls 32, the steel balls are fed into the groove through the aperture 65 of the tool. When the desired number of balls have been inserted, the tool 58 is unscrewed to permit the resilient nylon sleeve 36 to return the bearing ring 34 to its normal position at which it traps the steel balls in the circumferential groove 55, as may be seen in FIGURE 7.

The assembly shown in FIGURE 7 may be handled freely without likelihood of any of the assembled parts becoming separated. It is a simple matter to complete the assembly of the swivel joint by adding the second bearing ring 35 and screwing the outer passage body 10 into its assembled position in screwthreaded engagement with the bushing 12.

Figure 8:
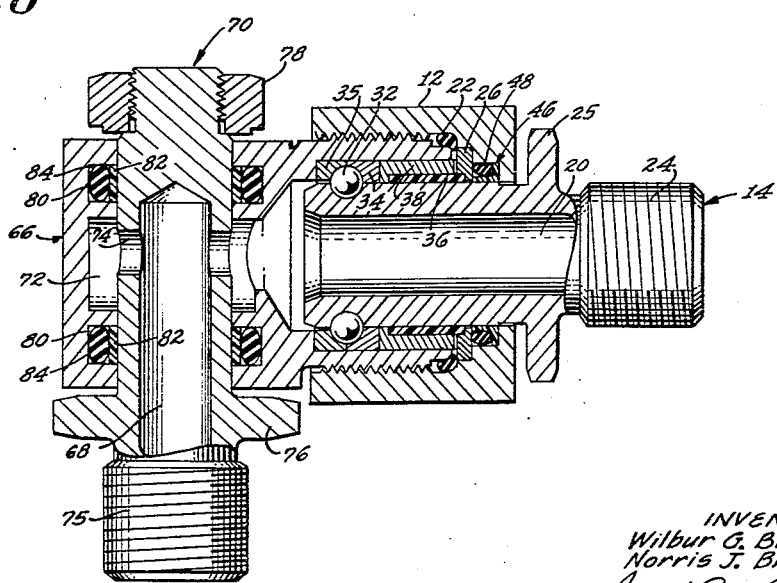
FIGURE 8 is a longitudinal sectional view of a second embodiment of the invention in the form of an angular swivel joint.

The second embodiment of the invention shown in FIGURE 8 is identical in many of its parts with the first embodiment of the invention, as indicated by the use of corresponding numerals to designate the corresponding parts. This embodiment of the invention is what may be termed an angular swivel joint since it has an outer passage body 66 with a fluid passage 68 therein that is perpendicular to the fluid passage 20 of the inner passage body 14. It is contemplated that the fluid passage 68 will be formed by a second inner passage body 70 that is journaled in the outer passage body 66 for rotation relative thereto. The outer passage body 66 is formed with an annular space 72 surrounding the second inner passage body 70 and the second inner passage body has a pair of diametrical apertures 74 communicating with this space to permit free flow of fluid between the two fluid passages 20 and 60.

One end of the second inner passage body 72 is formed with an external screw thread 75 for connection to the conduit and is also formed with a radial flange 76 which may be of hexagonal peripheral configuration to facilitate rotation by a suitable wrench. The second end of the second inner passage body 70 is of reduced diameter and is provided with an external screw thread to receive a retaining nut 78.

Suitable sealing means are provided around the second inner passage body 70 on opposite sides of the annular space 72 of the outer passage body 66. For this purpose the outer passage body 66 may be provided with two spaced inner circumferential grooves 80 to receive corresponding sealing means. Each of the two sealing means comprises an inner ring 82 and an outer ring 84. The inner sealing ring 82 is in the form of a Teflon band that snugly embraces the second inner passage member 70. The outer sealing ring 84 is an O-ring of neoprene that is of a cross-sectional diameter to be flattened under radial compression when forced into place. These sealing rings 82 and 84 remain stationary relative to the outer passage body 70.

Our description in specific detail of the two embodiments of the invention will suggest various changes, substitutions and other departures from our disclosure within the spirit and scope of the appended claims.

We claim:

1. In a swivel joint for conveying high pressure fluids, the combination of: an outer passage body and an inner passage body journaled therein and forming therewith an annular space around the inner body, one of said bodies having two axially spaced circumferential shoulders defining the ends of said space, said one body being made in two sections threaded together with said two shoulders on the two sections respectively; an anti-friction ball bearing in said annular space; and a relatively long bearing sleeve embracing said inner body in said annular space adjacent said ball bearing and lying in the same radial zone as the ball bearing, said sleeve being circumferentially confined against the inner body and being made of plastic material having a low coefficient of friction with respect to the adjacent surface of said inner body, said two bodies being free to rock relative to each other about said ball bearing as a fulcrum against the resistance in radial compression of said plastic sleeve whereby the plastic sleeve cushions forces tending to misalign the two bodies and distributes such forces over the area of the inner body with low frictional resistance to relative rotation of the two bodies, said ball bearing having axially separable parts, said plastic bearing sleeve being longitudinally resilient and yieldingly resisting axial separation of the separable parts of the ball bearing.

2. A combination as set forth in claim 1 in which said bearing comprises a series of balls, a peripheral circumferential groove in said inner body serving as an inner race of said balls and a pair of bearing rings forming a second outer groove serving as an outer race for said balls, said pair of bearing rings being axially separable and each forming approximately one-half of said outer groove, said inner groove and one of said rings being shaped and dimensioned to cooperate to trap said balls in said inner groove when said one ring is in its normal assembled position, said one ring being axially retractable against the resilient longitudinal resistance of said plastic bearing sleeve to admit said balls into said inner race, whereby in the procedure for assembling the swivel joint, said one ring may be retracted against the resilience of said plastic bearing sleeve to admit the balls into the inner race and then may be released to return to hold the balls in the inner race until the second ring is installed.

3. In a swivel joint for conveying high pressure fluids, the combination of: an outer passage body and an inner passage body journaled therein and forming therewith an annular space around the inner body, one of said bodies having two axially spaced circumferential shoulders defining the ends of said annular space, said one body being made in two sections threaded together with said two shoulders on the two sections respectively; a roller bearing in said annular space comprising a series of balls and an inner and outer race for the balls, said inner race being a peripheral circumferential groove in said inner body, said outer race being a pair of separable rings jointly forming an inner circumferential groove for the balls; a bearing sleeve embracing said inner body in said annular space between said bearing and one end of the annular space, said sleeve being circumferentially confined against the inner body and being made of resilient plastic material having a low coefficient of friction with respect to the adjacent surface of said inner body, said two bodies being free to rock relative to each other about said roller bearing as a fulcrum against the resistance in radial compression of said bearing sleeve whereby the bearing sleeve cushions and resists forces tending to misalign the two bodies and distributes such forces over the area of the inner body with low frictional resistance to relative rotation between the two bodies; and annular means abutting the end of said bearing sleeve away from said roller bearing and preventing movement of said end in a direction away from the roller bearing, said annular means being in engagement with one of said bodies, there being a circumferential clearance between said annular means and the other of said passage bodies to permit relative rocking movement of the two passage bodies, said bearing sleeve having freedom for longitudinal compression to permit retraction of one of said separable rings for access to said inner race for the introduction of said balls in the course of assembling the swivel joint.

4. A combination as set forth in claim 3 in which said peripheral circumferential groove and one of said separable rings are shaped and dimensioned to cooperate to trap said balls in said inner race when said one ring is in its normal assembled position, said one ring being axially retractable against the yielding longitudinal resistance of said resilient bearing sleeve to admit said balls into said inner race, whereby in the procedure for assembling the swivel joint said one ring may be retracted against the resilience of said bearing sleeve to admit said balls into the inner race and then may be released to return substantially to its normal position to hold the balls in the race.

References Cited in the file of this patent

UNITED STATES PATENTS

| | | |
|---|---|---|
| 1,095,863 | Hess | May 5, 1914 |
| 1,556,997 | Johnston | Oct. 13, 1925 |
| 1,923,399 | Sharp | Aug. 22, 1933 |
| 2,459,981 | Warren | Jan. 25, 1949 |
| 2,494,598 | Waring | Jan. 17, 1950 |
| 2,653,837 | Voytech | Sept. 29, 1953 |
| 2,705,177 | Waring | Mar. 29, 1955 |
| 2,747,899 | Wiltse | May 29, 1956 |
| 2,770,475 | Rafferty | Nov. 13, 1956 |
| 2,786,698 | Bard | Mar. 26, 1957 |
| 2,813,729 | Jackson | Nov. 19, 1957 |
| 2,835,540 | Jorgensen | May 20, 1958 |
| 2,848,255 | Klein | Aug. 19, 1958 |
| 2,857,184 | Mancusi | Oct. 21, 1958 |